United States Patent
Park et al.

(10) Patent No.: US 10,466,841 B2
(45) Date of Patent: Nov. 5, 2019

(54) CURVED TOUCH PANEL AND DISPLAY DEVICE COMPRISING SAME

(71) Applicant: SAMSUNG ELECTRONICS CO., LTD., Suwon-si (KR)

(72) Inventors: Kyung-wan Park, Suwon-si (KR); Shi-yun Cho, Anyang-si (KR); In-kwon Kang, Seoul (KR); Ga-eun Lee, Suwon-si (KR); Ji-hyun Jung, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/326,158

(22) PCT Filed: Jun. 23, 2015

(86) PCT No.: PCT/KR2015/006338
§ 371 (c)(1),
(2) Date: Jan. 13, 2017

(87) PCT Pub. No.: WO2016/010273
PCT Pub. Date: Jan. 21, 2016

(65) Prior Publication Data
US 2017/0205957 A1     Jul. 20, 2017

(30) Foreign Application Priority Data
Jul. 15, 2014 (KR) .................. 10-2014-0089275

(51) Int. Cl.
*G06F 3/041*     (2006.01)
*G06F 3/044*     (2006.01)

(52) U.S. Cl.
CPC ............ *G06F 3/0418* (2013.01); *G06F 3/044* (2013.01)

(58) Field of Classification Search
CPC .. G02B 27/01; G02B 5/02; G02B 2027/0118; B60R 1/00; B60R 2300/20; G06F 3/0418
See application file for complete search history.

(56) References Cited

U.S. PATENT DOCUMENTS 7,495,368 B2 *   2/2009   Gogoi ................. H01H 1/0036
                                                          310/300
8,810,543 B1 *   8/2014   Kurikawa ............ G06F 3/0416
                                                        178/18.06

(Continued)

FOREIGN PATENT DOCUMENTS

CN    102893245 A    1/2013
CN    103294275 A    9/2013

(Continued)

OTHER PUBLICATIONS

Communication dated Aug. 20, 2015, issued by the International Searching Authority in counterpart International Application No. PCT/KR2015/006338 (PCT/ISA/210 & 237).

(Continued)

*Primary Examiner* — Mihir K Rayan
(74) *Attorney, Agent, or Firm* — Sughrue Mion, PLLC

(57) ABSTRACT

A curved touch panel and a display device including the same are provided. The touch panel includes a flat region in which first sensing cells are arranged; and a curved region in which second sensing cells are arranged that are different from the first sensing cells in terms of at least one of an arrangement pattern and a shape.

14 Claims, 11 Drawing Sheets

(56) References Cited

U.S. PATENT DOCUMENTS

| | | | |
|---|---|---|---|
| 9,123,266 B2* | 9/2015 | Bastani | G09F 13/04 |
| 9,245,477 B2 | 1/2016 | Kwack et al. | |
| 9,785,292 B2* | 10/2017 | Yilmaz | G06F 3/044 |
| 2004/0051944 A1* | 3/2004 | Stark | G02F 1/13336 |
| | | | 359/448 |
| 2006/0214918 A1* | 9/2006 | Destura | G06F 3/0412 |
| | | | 345/173 |
| 2007/0264830 A1* | 11/2007 | Huang | H01L 21/0337 |
| | | | 438/694 |
| 2008/0158167 A1* | 7/2008 | Hotelling | G06F 3/0416 |
| | | | 345/173 |
| 2008/0291225 A1 | 11/2008 | Arneson | |
| 2009/0066665 A1 | 3/2009 | Lee | |
| 2009/0257189 A1 | 10/2009 | Wang et al. | |
| 2009/0322703 A1* | 12/2009 | Tseng | G06F 3/044 |
| | | | 345/174 |
| 2010/0117975 A1* | 5/2010 | Cho | G06F 1/1626 |
| | | | 345/173 |
| 2010/0245246 A1* | 9/2010 | Rosenfeld | G06F 3/03543 |
| | | | 345/163 |
| 2010/0245286 A1 | 9/2010 | Parker | |
| 2011/0216015 A1* | 9/2011 | Edwards | G06F 3/041 |
| | | | 345/173 |
| 2013/0034685 A1 | 2/2013 | An et al. | |
| 2013/0049771 A1* | 2/2013 | Peng | G06F 3/0418 |
| | | | 324/658 |
| 2013/0100053 A1 | 4/2013 | Kang et al. | |
| 2013/0215035 A1* | 8/2013 | Guard | G06F 3/0221 |
| | | | 345/168 |
| 2014/0009429 A1 | 1/2014 | Verweg et al. | |
| 2014/0022202 A1* | 1/2014 | Badaye | G06F 3/044 |
| | | | 345/174 |
| 2014/0132553 A1* | 5/2014 | Park | G06F 3/044 |
| | | | 345/174 |
| 2015/0035761 A1* | 2/2015 | Seo | G06F 3/044 |
| | | | 345/173 |
| 2015/0109254 A1 | 4/2015 | Han et al. | |
| 2016/0246144 A1* | 8/2016 | Liao | G02F 1/136286 |

FOREIGN PATENT DOCUMENTS

| | | | | |
|---|---|---|---|---|
| CN | 103514814 A | | 1/2014 | |
| CN | 103713436 | * | 9/2014 | G02F 1/1362 |
| KR | 1020110083957 A | | 7/2011 | |
| KR | 1020140046178 A | | 4/2014 | |

OTHER PUBLICATIONS

Communication issued by the European Patent Office dated Feb. 7, 2018 in counterpart European Patent Application No. 15821695.2.
Communication dated Sep. 4, 2018 issued by the State Intellectual Property Office of P.R. China in Counterpart Chinese Application No. 201580038581.0.

* cited by examiner

CURVED TOUCH PANEL AND DISPLAY DEVICE COMPRISING SAME

This application is a National stage entry of International Application No. PCT/KR2015/006338, filed on Jun. 23, 2015, which claims priority from Korean Patent Application No. 10-2014-0089275, filed on Jul. 15, 2014 in the Korean Intellectual Property Office. The disclosures of each of the applications are herein incorporated by reference in their entirety.

TECHNICAL FIELD

The present disclosure relates to a touch panel including a curved region and a display device including the same.

BACKGROUND ART

Display devices include liquid crystal display (LCD) devices, organic light emitting display (OLED) devices, electroluminescence display (ELD) devices, etc. These display devices may include a touch sensing function capable of interacting with a user in addition to a function of displaying an image. With regard to the touch sensing function, when a user touches a screen by using a finger or a touch pen and writes letters or draws pictures, a display device senses a change such as pressure, a charge, light, etc. applied to the screen and obtains touch information such as whether an object touches the screen and a touch position. The display device may display an image based on the touch information.

However, when the display device includes a bent region, i.e. a curved region, there may be an increase in an error occurrence frequency with respect to sensing a touch in the curved region compared to a flat region.

DETAILED DESCRIPTION OF THE INVENTION

Technical Problem

An embodiment provides a touch panel capable of reducing an error occurrence frequency with respect to sensing of a touch in a curved region and a display device including the same.

An embodiment provides a touch panel having increased touch sensitivity in a curved region and a display device including the same.

Technical Solution

According to an embodiment, a touch panel includes: a flat region in which first sensing cells are arranged; and a curved region in which second sensing cells are arranged that are different from the first sensing cells in terms of at least one of an arrangement pattern and a shape.

Shapes of the first sensing cells may be uniform.

Arrangement distances of the first sensing cells may be uniform.

At least one of arrangement distances of the second sensing cells may be different from arrangement distances of the first sensing cells.

At least one of arrangement distances of the second sensing cells may be less than the arrangement distances of the first sensing cells.

Arrangement distances of the second sensing cells may differ according to a curve degree of the curved region.

Arrangement distances of the second sensing cells may be reduced as the curve degree is increased.

An arrangement density of the second sensing cells may be different from an arrangement density of the first sensing cells.

The arrangement density of the second sensing cells may be higher than the arrangement density of the first sensing cells.

A size of at least one of the second sensing cells may be different from sizes of the first sensing cells.

The size of at least one of the second sensing cells may be greater than the sizes of the first sensing cells.

An electrical conductivity of at least one of the second sensing cells may be different from an electrical conductivity of the first sensing cells.

The touch panel may further include: a sensing circuit configured to determine a touch point by using sensing output signal received from some of the first sensing cells and the second sensing cells.

When the determined touch point is in the curved region, the sensing circuit may re-determine the touch point by using sensing output signals received from others of the second sensing cells.

At least one of the first sensing cells and the second sensing cells may include first and second electrodes spaced apart from each other and having capacitance varying according to a touch of an external object with respect to the touch panel.

The first and second electrodes may be arranged on different surfaces and may overlap with each other.

The first and second electrodes may be arranged on the same surface and may not overlap with each other.

According to an embodiment, a display device includes: a display panel configured to display an image; and the touch panel of claim 1 arranged on the display panel.

A region of the display panel overlapping with the curved region may be curved.

Advantageous Effects of the Invention

A touch panel of the present disclosure has a different arrangement pattern or shape of a sensing cell in a curved region and a flat region, thereby enhancing a sensing precision or a sensing sensitivity of the curved region.

DETAILED DESCRIPTION

Figure 1:
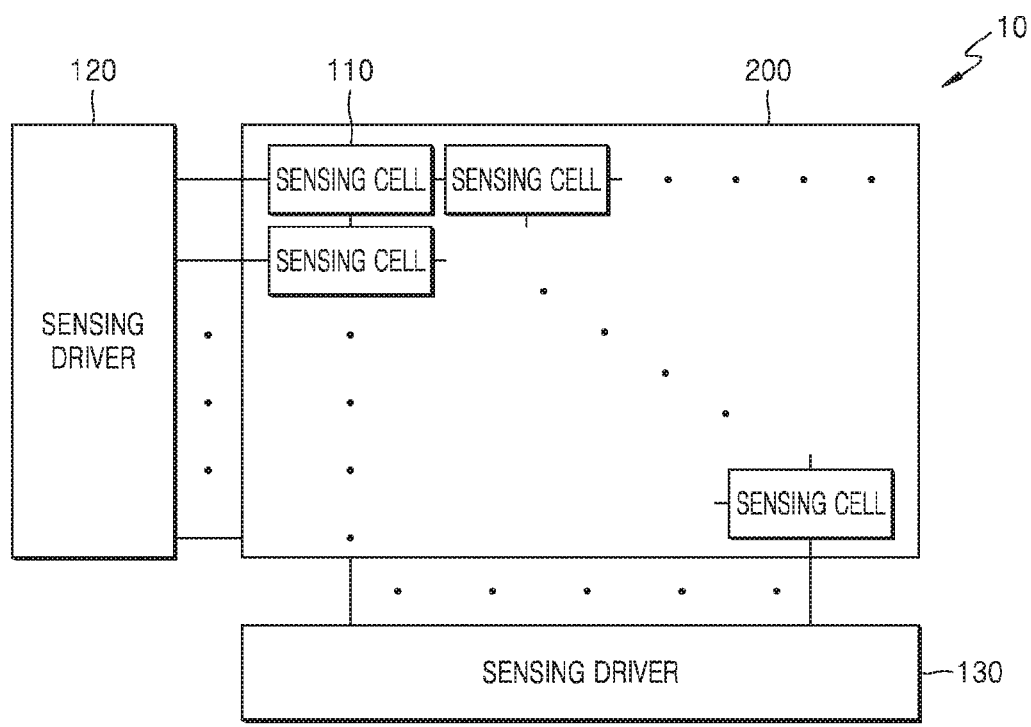
FIG. 1 is a block diagram of a touch panel according to an embodiment.

Reference will now be made in detail to preferred embodiments, examples of which are illustrated in the accompanying drawings, wherein like reference numerals refer to like elements throughout and redundant descriptions thereof are omitted.

FIG. 1 is a block diagram of a touch panel 10 according to an embodiment. As shown in FIG. 1, the touch panel 10 may include a plurality of sensing cells 110 sensing whether there is a touch, a sensing driver 120 providing a sensing driving signal to the plurality of sensing cells 110, and a sensing circuit 130 receiving a signal changed according to a touch, i.e. a sensing output signal, from the sensing cells 110 and determining a sensing point.

The sensing cells 110 may generate the sensing output signal according to a touch by using a capacitance method. Each of the sensing cells 110 may receive the sensing driving signal from the sensing driver 120 and apply the sensing output signal to the sensing circuit 130. The plurality of sensing cells 110 may be arranged in a matrix shape.

Each of the sensing cells 110 may include an electrode pair that are spaced apart from each other and change a charge amount according to a touch. For example, if the sensing driving signal is input to the sensing cells 110, a predetermined charge amount is charged between the electrode pair, and the charge amount changed according to whether there is a touch is output as the sensing output signal. That is, if there is a touch of an external object, the charge amount charged between the electrode pair is changed, and accordingly, the sensing output signal is output. In general, a voltage level of the sensing output signal when an object touches the touch panel 10 may be less than a voltage level of the sensing output signal when the object does not touch the touch panel 10. A difference in the sensing output signal when the object touches the touch panel 10 and when the object does not touch the touch panel 10 may be approximately in proportion to a charge variation of the electrode pair.

Meanwhile, a region in which the plurality of sensing cells 110 are arranged may be referred to as a touch region 200. The touch region 200 according to an embodiment may be divided into a flat region having a flat shape and a curved region having a bent shape compared to the flat region 210. The curved region may be a region maintaining a bent state and a region of which a bending degree may be changed by applying an external pressure.

Figure 2A:
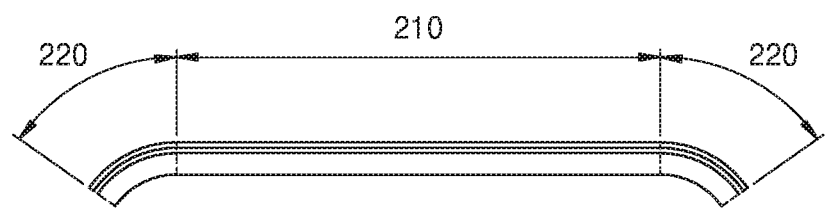
FIGS. 2A through 2D are schematic diagrams of a touch region including flat regions and curved regions, according to an embodiment.

FIGS. 2A through 2D are schematic diagrams of the touch region 200 including flat regions 210, 210a and 210b and curved regions 220, 220a, 220b, 210a, and 210b, according to an embodiment. As shown in FIGS. 2A through 2D, the touch region 200 may include the flat region 210 and the curved region 220 adjacent to the flat region 210. As shown in FIG. 2A, the curved regions 220 may be arranged in both left and right sides of the flat region 210. Positions of the curved regions 220 are not limited thereto. The curved regions 220 may be arranged in both upper and lower sides of the flat region 210. Also, with respect to the touch region 200, the flat region 210 may be arranged in a right side, the curved region 220 may be arranged in a left side, the flat region 210 may be arranged in an upper side, the curved region 220 may be arranged in a lower side, and opposite arrangements thereof are possible.

Figure 2B:
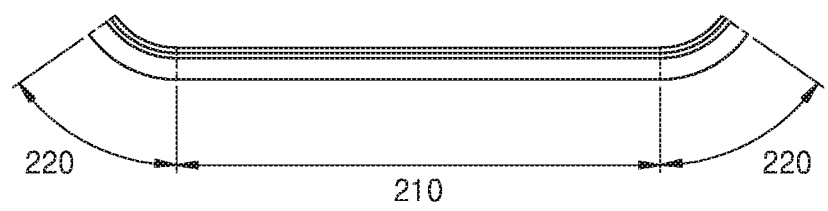

The curved region 220 may have a convex shape as shown in FIG. 2A but is not limited thereto. The curved region 220 may have a concave shape as shown in FIG. 2B.

Figure 2C:
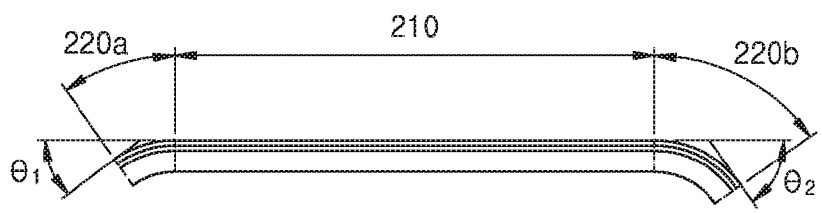

Also, when the curved regions 220 are arranged in both sides with respect to the flat region 210, the two curved regions 220 may be symmetrically arranged but are not limited thereto. As shown in FIG. 2C, the curved regions 220a and 220b may be asymmetrically arranged with respect to the flat region 210.

Figure 2D:
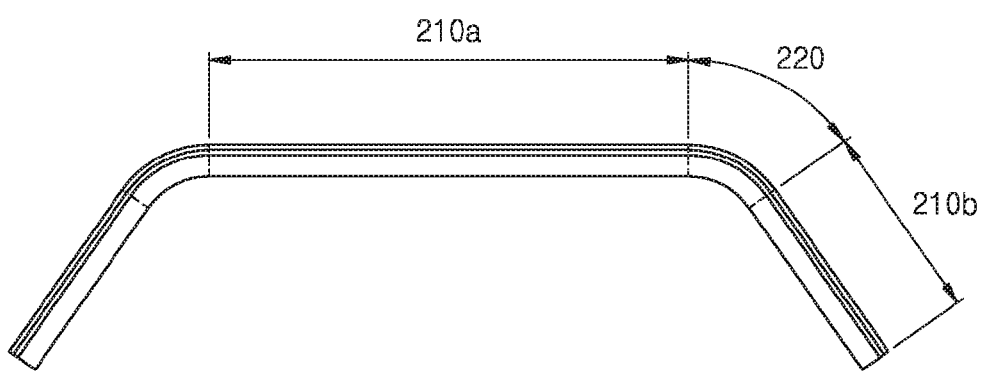

The touch region 200 may include the curved region 220 arranged between the two spaced flat regions 210a and 210b and the two flat regions 210a and 210b as shown in FIG. 2D. A curved degree of the curved region 220 may be fixed and changed according to an external control signal. For example, the second flat region 210b may rotate toward a front surface of the touch region 200 or a rear surface with respect to the first flat region 210a. Even when the second flat region 210b rotates with respect to the first flat region 210a, only the curved region 220 may be bent while the second flat region 210b may not be bent.

Meanwhile, when a user inputs a user command through an operation of touching, dragging, or flicking the curved region 220, an occurrence of a touch error is higher than that of the flat region 210. This is because a touch area is changed instantly when a curved region is touched, unlike a flat region, and thus the touch panel 10 recognizes a touch point different from a user's intention. Thus, a touch sensitivity may be increased as a variation of capacitance of the same sensing cell increases, and a touch precision may be increased as the number of sensing cells increases.

The touch panel 10 according to an embodiment may increase the touch sensitivity and the touch precision since sensing cells arranged in the curved region 220 are different from sensing cells arranged in the flat region 210 in terms of at least one of an arrangement pattern and a shape.

Figure 3A:
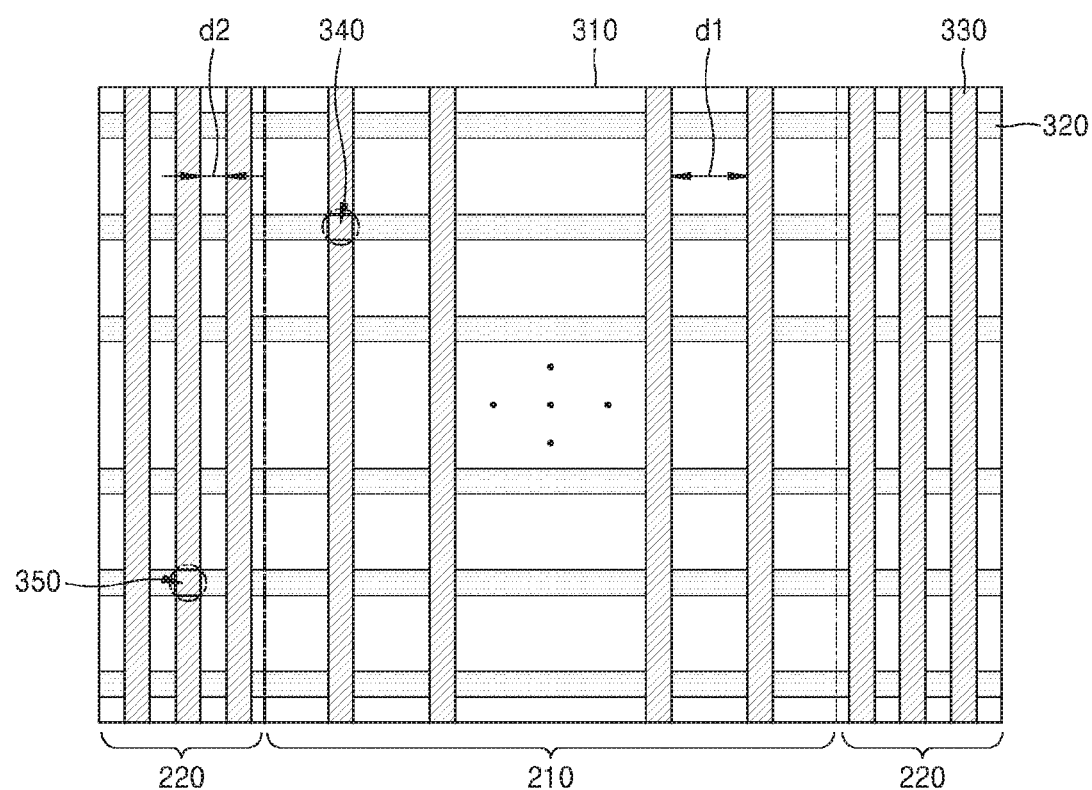
FIGS. 3A and 3B are diagrams for describing sensing cells arranged in a flat region and a curved region, according to an embodiment.
Figure 3B:
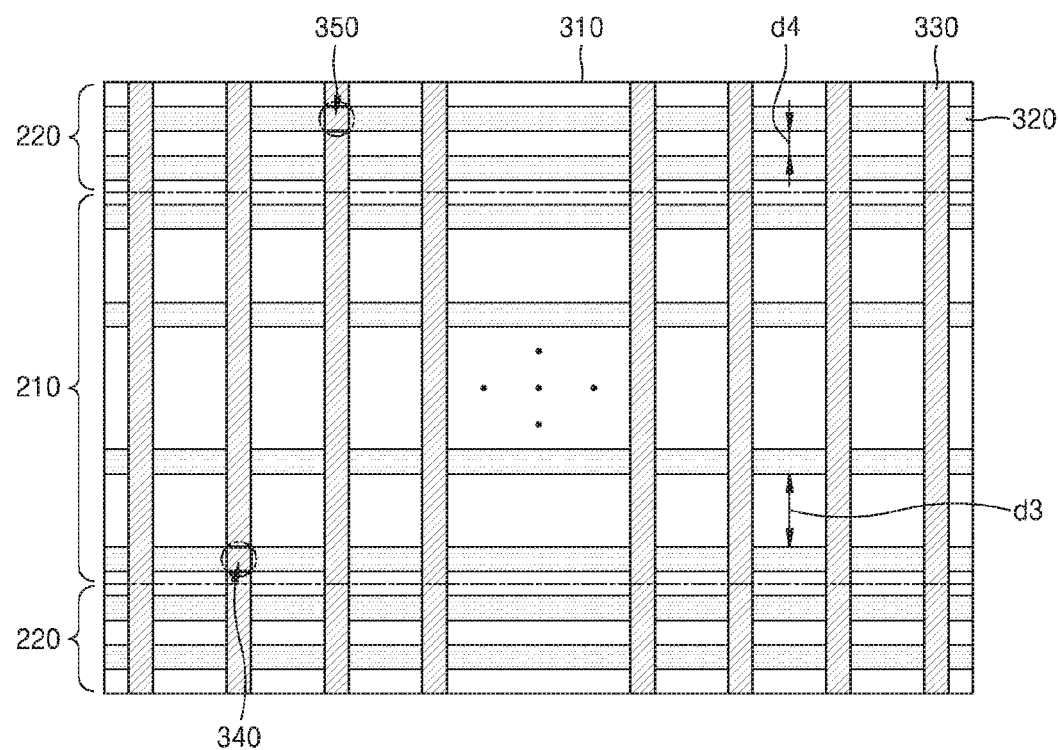

FIGS. 3A and 3B are diagrams for describing sensing cells 340 and 350 arranged in the flat region 210 and the curved region 220, according to an embodiment. As shown in FIG. 3A, a touch region may include a substrate 310, a plurality of first electrodes 320 arranged in a first direction (for example, an x direction) on the substrate 310, and a plurality of second electrodes 330 arranged in a second direction (for example, a y direction) across the first direction so as not to contact the plurality of first electrodes 320. For example, the first electrodes 320 may be arranged on the substrate 310, an insulating layer (not shown) may be arranged covering the first electrodes 320, and the second electrodes 330 may be arranged on the insulating layer.

The substrate 310 may be arranged over the flat region 210 and the curved region 220 and may be transparent. The substrate 310 may include polyethylene terephthalate (PET), polycarbonate (PC), polymethyl methacrylate (PMMA), polyethylene naphthalate (PEN), polyethersulfone (PES), cyclic olefin polymer (COC), a polyvinyl alcohol (PVA) film, a polyimide (PI) film, polystyrene (PS), or biaxially oriented PS (BOPS), etc. but is not necessarily limited thereto. The substrate 310 may preferably include polyethylene terephthalate (PET), polyimide (PI), polycarbonate (PC), a triacetate cellulose (TAC) film, etc.

The first and second electrodes 320 and 330 may include transparent and conductive materials. For example, the first and second electrodes 320 and 330 may include transparent metal, transparent and conductive oxide, or a transparent and conductive semiconductor, etc.

The first electrodes 320 or the second electrodes 330 may be connected to the sensing driver 120 and the other ones of the first electrodes 320 and the second electrodes 330 may be connected to the sensing circuit 130 For example, the first electrodes 320 may be connected to the sensing driver 120 and the second electrodes 330 may be connected to the sensing circuit 130.

Overlapping regions of the first electrodes 320 and the second electrodes 330 may be the sensing cells 340 and 350. A region of the first electrodes 320 connecting the sensing cell 110 and the sensing driver 120 may be a driving line. A region of the second electrodes 330 connecting the sensing cell 110 and the sensing circuit 130 may be a sensing line.

At least one of an arrangement pattern and a shape of the first sensing cells 340 and 350 may be different according to the flat region 210 and the curved region 220. A sensing cell arranged in the flat region may be the first sensing cell 340, and a sensing cell arranged in the curved region 220 may be the second sensing cell 350 below.

Shapes of the first sensing cells 340 may be uniform. Arrangement distances between the first sensing cells 340 may also be uniform. When the first sensing cell 340 and the second sensing cell 350 are 2-dimensionally arranged, arrangement distances may be classified as a first direction (for example, an x axis) arrangement distance and a second direction (for example, a y axis) arrangement distance. In this regard, uniform arrangement distances mean uniform arrangement distances between sensing cells arranged in the same direction. That is, although the first direction arrangement distance and the second direction arrangement distance have different sizes, if distances of sensing cells arranged in a first direction are uniform, and distances of sensing cells arranged in a second direction are uniform, the arrangement distances of the sensing cells may be uniform.

Furthermore, shapes and arrangement distances of the second sensing cells 350 may be uniform. However, the arrangement distances of the second sensing cells 350 may be different from the arrangement distances of the first sensing cells 340. For example, at least one of the arrangement distances of the second sensing cells 350 may be less than the arrangement distances of the first sensing cells 340. In FIG. 3A, the first sensing cells 340 are arranged with a first distance d1, and the second sensing cells 350 are arranged with a second distance d2 less than the first distance d1. Thus, an arrangement density of the sensing cell 110 in the curved region 220 is greater than an arrangement density of the sensing cell 110 in the flat region 210, and thus the sensing circuit 130 may increase a touch precision in the curved region 220.

An arrangement distance d of the second electrodes 330 in the curved region 220 is reduced in FIG. 3A but is not limited thereto. In an upper or lower region of the touch region 200 in the curved region 200, as shown in FIG. 3B, an arrangement distance d4 of the second electrodes 350 may be small such that the arrangement distance d4 of the second sensing cells 350 is less than an arrangement distance d3 of the first sensing cells 340.

Alternatively, upper and lower or left and right edges of a touch region may be a curved region, and first electrodes or second electrodes may be closely arranged in the curved region so that arrangement spaces of second sensing cells may be small.

Figure 4:
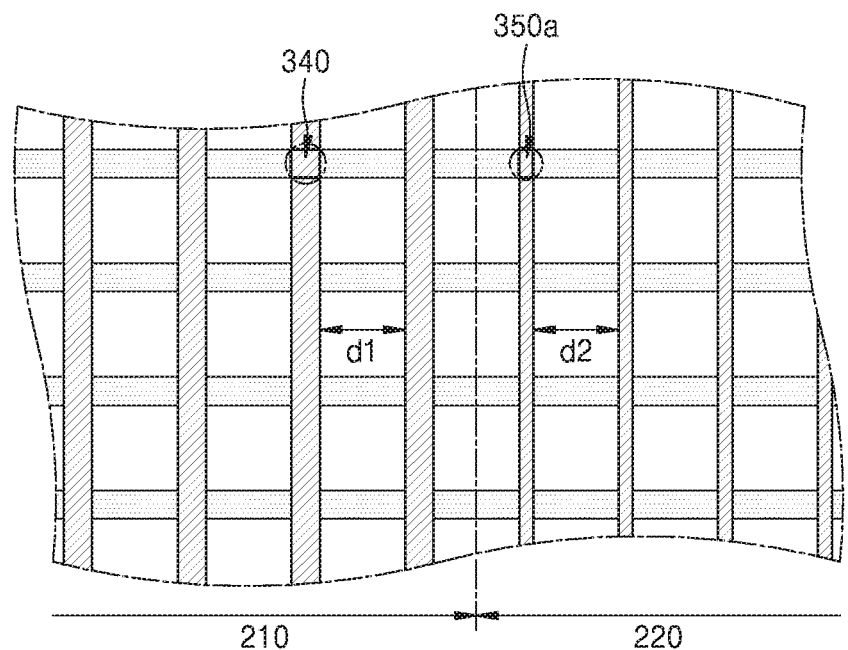
FIGS. 4 through 7 are reference diagrams for describing sensing cells arranged in a touch region, according to another embodiment.

FIGS. 4 through 7 are reference diagrams for describing sensing cells arranged in a touch region, according to another embodiment. As shown in FIG. 4, a size of a second sensing cell 350a may be smaller than a size of the first sensing cell 340. Since the size of a second sensing cell 350a is smaller than the size of the first sensing cell 340, more second sensing cells 350a may be arranged in the curved region 220, and thus a sensing precision may be increased.

Figure 5:
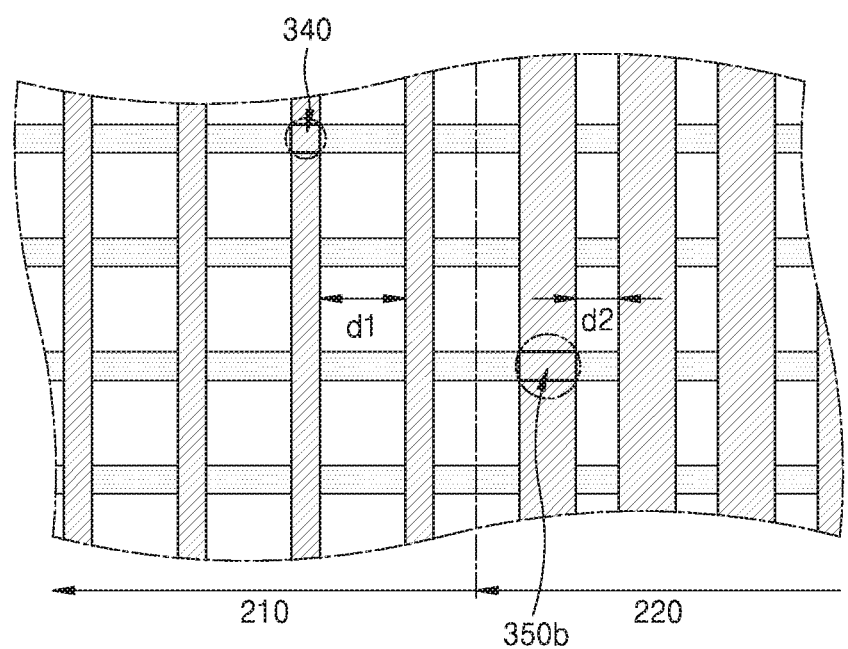

Alternatively, as shown in FIG. 5, a size of a second sensing cell 350b may be greater than the size of the first sensing cell 340. Since the size of the second sensing cell 350b is greater than the size of the first sensing cell 340, a variation of capacitance may be increased according to a touch in the curved region 220. Thus, a sensing precision may be increased in the curved region 220.

Figure 6:
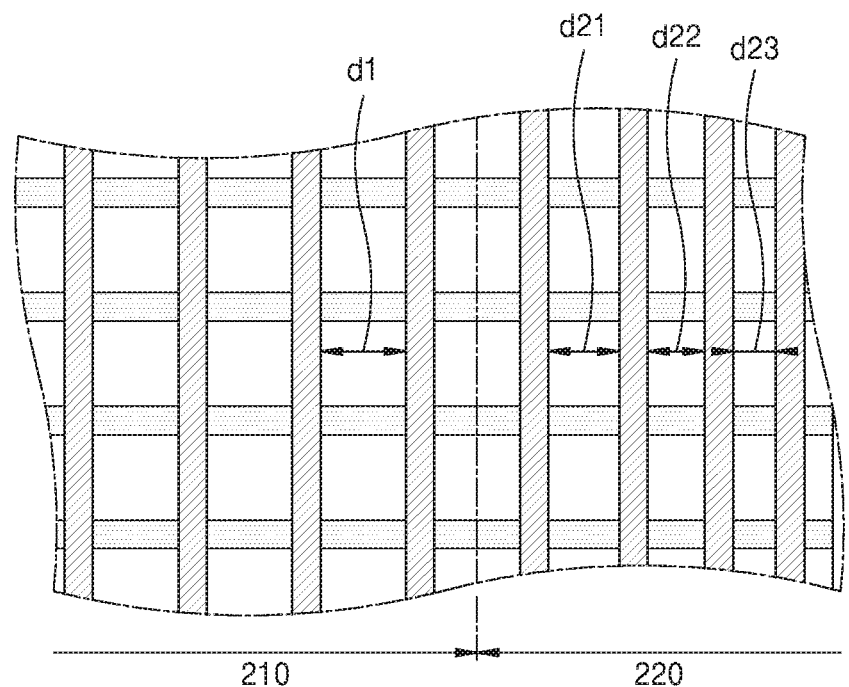

Furthermore, arrangement distances of second sensing cells may be different in correspondence to a curve angle in the curved region 220. As the curved region 220 gets farther from the flat region 210, the curve angle may be increased. Thus, as shown in FIG. 6, arrangement distances d21, d22, and d23 of second sensing cells arranged in the curved region 220 may be reduced as the curved region 220 gets farther from the flat region 210. An arrangement distance is reduced in FIG. 6 but is not limited thereto. As the curved region 220 gets farther from the flat region 210, since sizes of the second sensing cells 350 are reduced, a sensing precision may be increased. As the curved region 220 gets farther from the flat region 210, since the sizes of the second sensing cells 350 are increased, a sensing precision may be increased.

Figure 7:
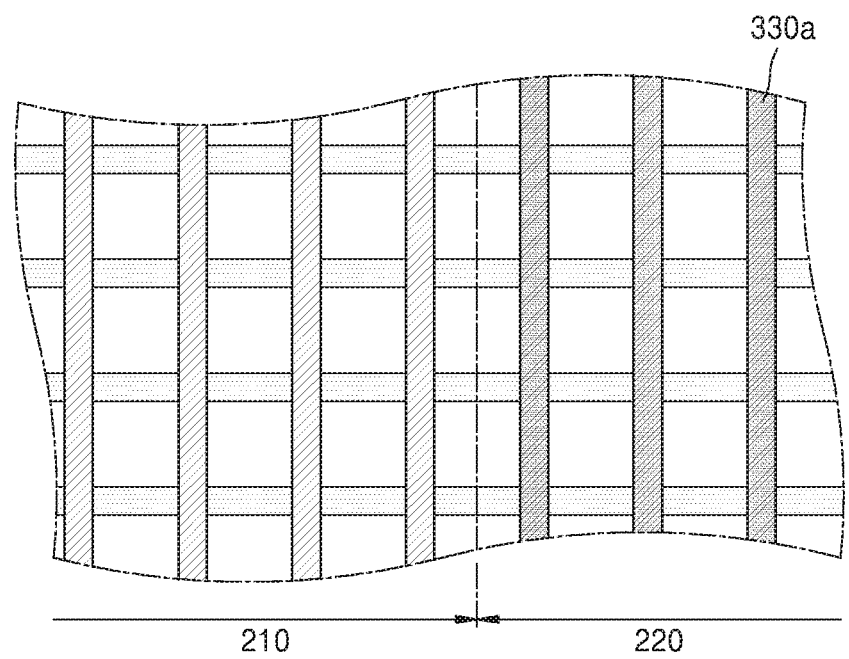

Alternatively, as shown in FIG. 7, an electrical conductivity of at least some regions among electrodes arranged in the curved region 220 may be different from an electrical conductivity of electrodes arranged in the flat region 210. For example, the electrical conductivity of the electrodes (for example, the second electrode 330a) arranged in the curved region 220 may be higher than the electrical conductivity of the electrodes arranged in the flat region 210. Since the electrical conductivity of the electrodes arranged in the curved region 220 is high, the electrodes may have a higher sensitivity than that of the electrodes arranged in the flat region 210. At least some regions among the electrodes arranged in the curved region 220 may be additionally coated with a transparent and conductive paste such as AgNW, CNT, etc., and thus a surface resistance of the electrodes arranged in the curved region 220 may be reduced, thereby increasing the electrical conductivity.

Figure 8:
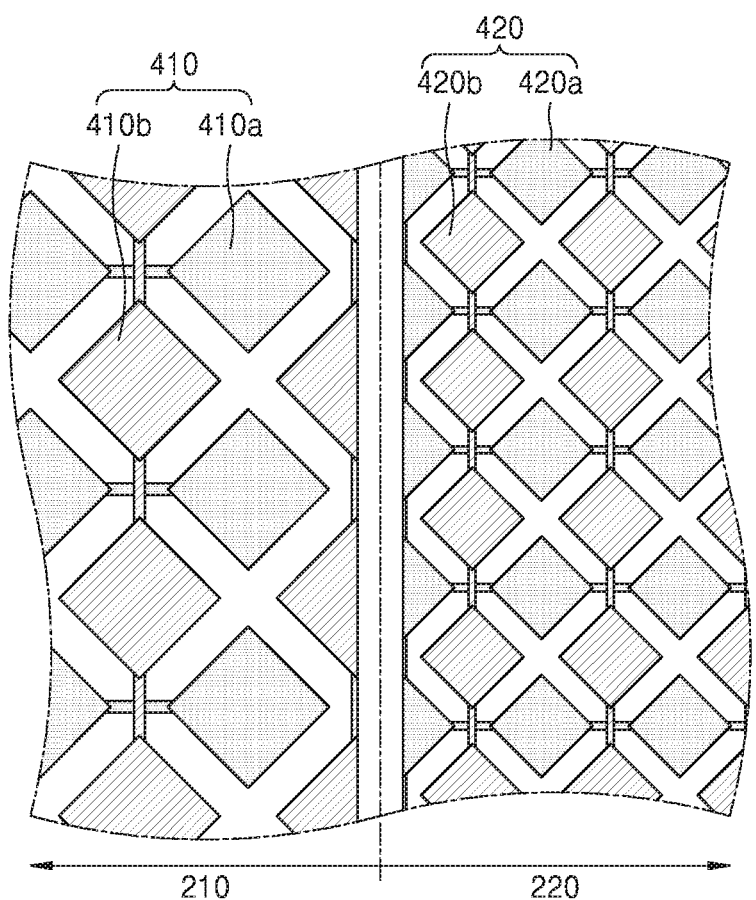
FIG. 8 is a diagram for describing sensing cells arranged in a touch region, according to another embodiment.

FIG. 8 is a diagram for describing sensing cells arranged in the touch region 200, according to another embodiment. As shown in FIG. 8, the touch region 200 may include electrode pads 410a, 410b, 420a, and 420b. The electrode pads 410a, 410b, 420a, and 420b of FIG. 8 may have a diamond shape or a triangular shape but are not limited thereto. The electrode pads 410a, 410b, 420a, and 420b may have a polygonal shape such as a rectangular shape, a hexagonal shape, etc. A driving line and a sensing line may be connected to the electrode pads 410a, 410b, 420a, and 420b. For example, the driving line may be used to connect the electrode pads 410a and 420a arranged in a first direction, and the sensing line may be used to connect the electrode pads 410b and 420b arranged in a second direction crossing the first direction. An insulating layer may be disposed between the driving line and the sensing line in order to prevent the driving line and the sensing line from contacting each other. The electrode pads 410a and 420a connected to the driving line may be driving electrodes. The electrode pads 410b and 420b connected to the sensing line may be sensing electrodes. Thus, the driving electrodes and the sensing electrodes may cross each other in a diagonal direction. The driving electrodes and the sensing electrodes that are adjacent to each other may be a pair of the sensing cells 410 and 420. As described above, the sensing cells 410 and 420 may be formed as electrodes that are adjacent to each other but do not overlap with each other, and thus a thickness of a touch panel may be reduced.

As shown in FIG. 8, a size of the sensing cell 420 arranged in the curved region 220 may be smaller than a size of the sensing cell 410 arranged in the flat region 210, and thus an arrangement density of a sensing cell may be increased in the curved region 220. The arrangement density of the curved region 220 is increased through a size of the sensing cell in FIG. 8 but is not limited thereto. The arrangement density may be adjusted through arrangement spaces. Also, a size of an electrode pad may be increased in the curved region 220 while arrangement spaces are uniform, and thus a touch sensitivity of the curved region 220 may be increased.

Figure 9:
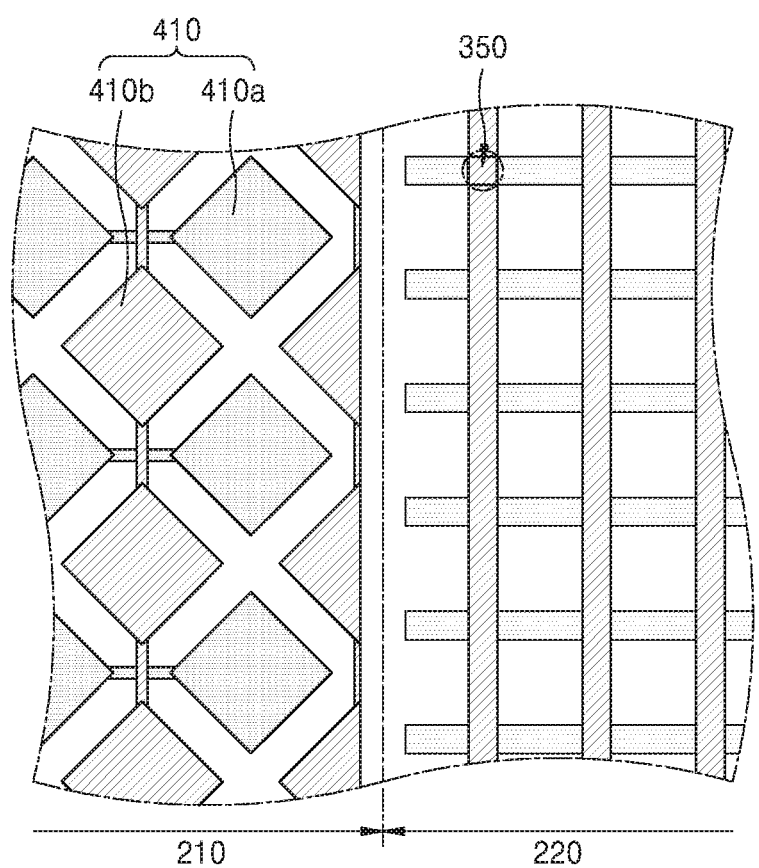
FIG. 9 is a diagram for describing sensing cells arranged in a touch region, according to another embodiment.

A type of a sensing cell arranged in a flat region may be different from a type of a sensing cell arranged in a curved region. FIG. 9 is a diagram for describing sensing cells arranged in a touch region according to another embodiment. As shown in FIG. 9, the sensing cell 410 arranged in the flat region 210 may include the driving electrode 410a and the sensing electrode 410b that are arranged on the same surface and do not overlap with each other, and the sensing cell 350 arranged in the curved region 220 may include a driving electrode and a sensing electrode that are arranged on different surfaces and overlap with each other.

As described above, an arrangement pattern or a shape of a sensing cell arranged in a curved region may be different from an arrangement pattern or a shape of a sensing cell arranged in a flat region, thereby making a touch precision or a touch sensitivity different. As an arrangement density of the sensing cell of the curved region is increased, signal processing for determining a touch point may be delay. To minimize such a delay, a touch panel may selectively use a receiving output signal of the sensing cell arranged in the curved region.

Figure 10:
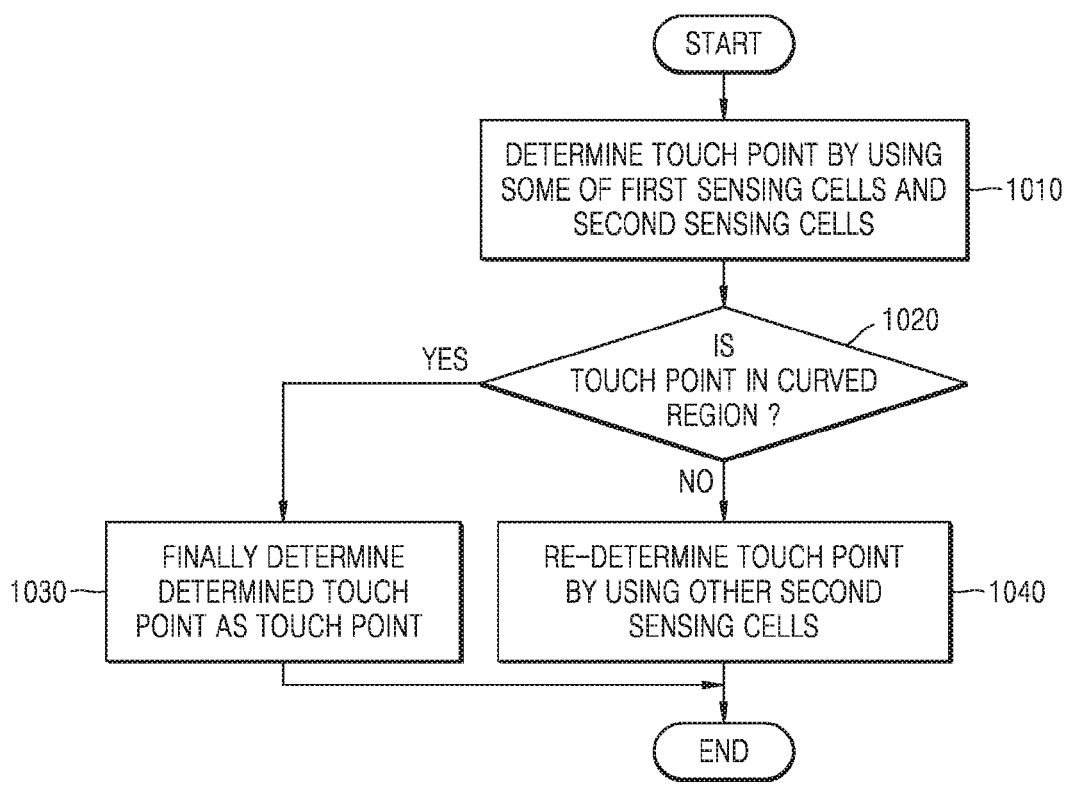
FIG. 10 is a flowchart for describing a method of determining a touch point in a curved region, according to an embodiment.

FIG. 10 is a flowchart for describing a method of determining a touch point in a curved region according to an embodiment. A sensing result of the sensing cell 110 is applied to the sensing circuit 130 through a sensing line. The sensing circuit 130 determines the touch point by using a sensing output signal received from some of the first sensing cells 340 of the flat region 210 and the second sensing cells 350 of the curved region 220 (S1010). For example, when the touch region 200 is the same as shown in FIG. 3, the sensing circuit 130 may determine the touch point by using the sensing output signal received through the second electrodes 330 excluding the second electrodes 330 arranged in an edge of the touch region 200.

The sensing circuit 130 determines whether the determined touch point is in the curved region 220 (S1020). When the touch point is not in the curved region 220 (S1020-N), that is, if it is determined that the touch point is in the flat region 210, the sensing circuit 130 finally determines the determined touch point as the touch point (S1030).

However, if it is determined that the determined touch point is in the curved region 220 (S1030-Y), the sensing circuit 130 re-determines the touch point by using a sensing output signal received from the other second sensing cells 350 arranged in the curved region 220 (S1040). Since the previously determined touch point uses the sensing output signal received from some of the second sensing cells 350 of the curved region 220, a precision of the touch point may be reduced. Thus, when the touch point is in the curved region 220, the sensing circuit 130 may re-determine the touch point by using the sensing output signal of the other second sensing cells 350, thereby increasing the precision of the touch point. As described above, a sensing output signal of the curved region 220 may be selectively used, and thus a signal processing delay with respect to sensing of a touch may be prevented.

Figure 11:
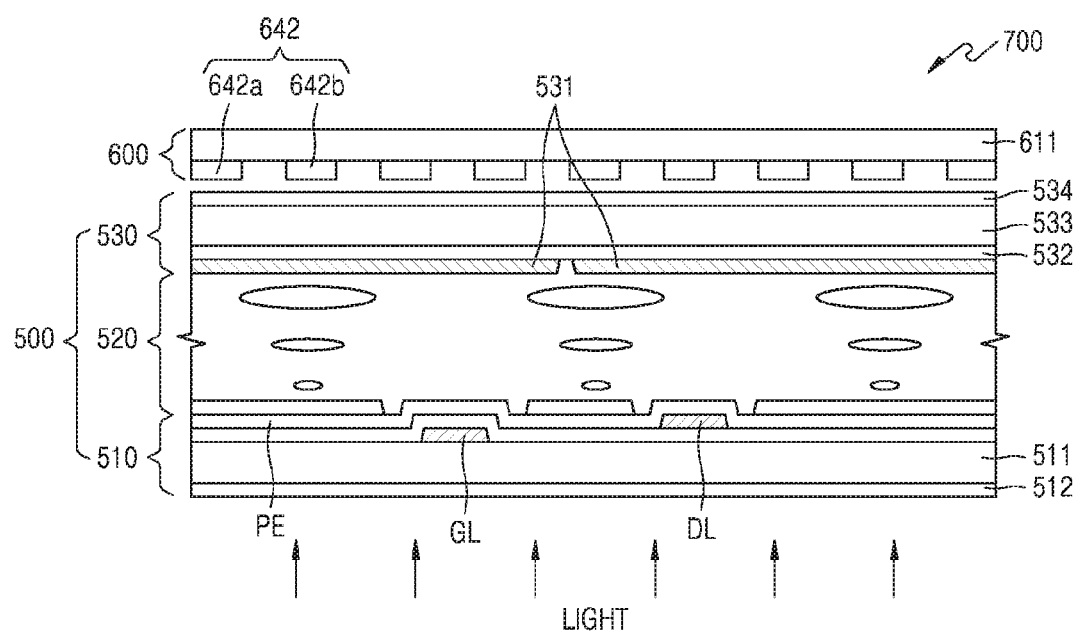
FIG. 11 is a schematic cross-sectional view of a display device including a touch panel, according to an embodiment.

The touch panel described above may be a component of a display device by being combined with a display panel. FIG. 11 is a schematic cross-sectional view of a display device 700 including a touch panel 600 according to an embodiment. As shown in FIG. 11, the display device 700 may include a display panel 500 displaying an image, etc. and the touch panel 600 arranged on the display panel 500 and sensing a touch. The touch panel 600 may include an electrode pair 540 that does not overlap with a substrate 610. However, the present embodiment is not limited thereto. All touch panels described above may apply to the touch panel 600.

The display panel 500 may have a stack of many layers for performing a display function. For example, the display panel 500 may include an array substrate 510, a liquid crystal layer 520, and an opposite substrate 530. The array substrate 510 may include a first substrate 511 in which a source line DL, a gate line GL, and a pixel electrode PE are formed and a first optical film 512 arranged in a lower portion of the first substrate 511. The opposite substrate 530 may include a second substrate 533 in which a common electrode 531 and a color filter 532 are formed and a second optical film 534.

A liquid crystal panel is illustrated in FIG. 11 but is not limited thereto. An organic light emitting display (OLED) panel including at least one thin film transistor and an organic emission element, a field emission display panel, a field emitting display panel, an electroluminescence display (ELD) panel, etc. may apply to a display panel.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

The invention claimed is:

1. A touch panel comprising:
   first sensing cells which are arranged on a flat region maintaining a flat state; and
   second sensing cells which are arranged on a curved region maintaining a curved state, the second sensing cells being different from the first sensing cells in terms of at least one of an arrangement pattern and a shape,
   wherein arrangement distances of the second sensing cells, which are measured along the curved region, differ according to a curve angle of the curved region, and
   wherein a first arrangement distance of the second sensing cells corresponding to a first curve angle is different from a second arrangement distance of the second sensing cells corresponding to a second curve angle, which is different from the first curve angle.

2. The touch panel of claim 1, wherein at least one of shapes and arrangement distances of the first sensing cells are uniform.

3. The touch panel of claim 1, wherein at least one of arrangement distances of the second sensing cells is different from arrangement distances of the first sensing cells.

4. The touch panel of claim 3, wherein at least one of arrangement distances of the second sensing cells is less than the arrangement distances of the first sensing cells.

5. The touch panel of claim 1, wherein an arrangement density of the second sensing cells is different from an arrangement density of the first sensing cells.

6. The touch panel of claim 5, wherein the arrangement density of the second sensing cells is higher than the arrangement density of the first sensing cells.

7. The touch panel of claim 1, wherein a size of at least one of the second sensing cells is different from sizes of the first sensing cells.

8. The touch panel of claim 7, wherein the size of at least one of the second sensing cells is greater than the sizes of the first sensing cells.

9. The touch panel of claim 1, wherein an electrical conductivity of at least one of the second sensing cells is different from an electrical conductivity of the first sensing cells.

10. The touch panel of claim 1, further comprising: a sensing circuit configured to determine a touch point by using sensing output signals received from some of the first sensing cells and the second sensing cells.

11. The touch panel of claim 10, wherein, when the determined touch point is in the curved region, the sensing circuit re-determines the touch point by using sensing output signals received from others of the second sensing cells.

12. The touch panel of claim 1, wherein at least one of the first sensing cells and the second sensing cells comprises first and second electrodes spaced apart from each other and having capacitance varying according to a touch of an external object with respect to the touch panel.

13. A display device comprising:
a display panel configured to display an image; and
the touch panel of claim 1 arranged on the display panel.

14. The display device of claim 13, wherein a region of the display panel overlapping with the curved region is curved.

* * * * *